(12) United States Patent
Chien et al.

(10) Patent No.: US 7,904,303 B2
(45) Date of Patent: Mar. 8, 2011

(54) ENGAGEMENT-ORIENTED RECOMMENDATION PRINCIPLE

(75) Inventors: Shu-Yao Chien, Sunnyvale, CA (US); Amitabh Seth, Saratoga, CA (US)

(73) Assignee: Yahoo! Inc., Sunnyvale, CA (US)

( * ) Notice: Subject to any disclaimer, the term of this patent is extended or adjusted under 35 U.S.C. 154(b) by 817 days.

(21) Appl. No.: 11/844,959

(22) Filed: Aug. 24, 2007

(65) Prior Publication Data

US 2009/0055257 A1    Feb. 26, 2009

(51) Int. Cl.
*G06Q 10/00* (2006.01)
(52) U.S. Cl. ....................................................... 705/1.1
(58) Field of Classification Search .................... 705/1.1
See application file for complete search history.

(56) References Cited

U.S. PATENT DOCUMENTS

| | | | |
|---|---|---|---|
| 6,545,209 B1* | 4/2003 | Flannery et al. | 84/609 |
| 6,697,800 B1* | 2/2004 | Jannink et al. | 1/1 |
| 2005/0096997 A1* | 5/2005 | Jain et al. | 705/26 |
| 2006/0230040 A1* | 10/2006 | Curtis et al. | 707/7 |
| 2007/0011039 A1* | 1/2007 | Oddo | 705/10 |
| 2007/0150467 A1* | 6/2007 | Beyer et al. | 707/5 |
| 2008/0162574 A1* | 7/2008 | Gilbert | 707/104.1 |
| 2008/0270398 A1* | 10/2008 | Landau et al. | 707/6 |
| 2009/0125387 A1* | 5/2009 | Mak et al. | 705/14 |

* cited by examiner

*Primary Examiner* — Jonathan Ouellette
(74) *Attorney, Agent, or Firm* — Statter-Suh PC

(57) ABSTRACT

A method selects a predictor item that has a relevance to a user. The method receives a set of affinity items having affinity scores that relate the predictor item to the affinity items. The method filters the list of affinity items based on the affinity scores, and selects a first set of affinity items from the filtered items. For each selected affinity item, the method calculates a difference score from the predictor item, and selects a first affinity item based on the difference score for the first affinity item. Preferably, content is presented to the user based on the selected first affinity item. Additional embodiments include a system and/or computer readable medium having instructions for execution of the foregoing.

12 Claims, 7 Drawing Sheets

Figure 5

| Predictor Item | Affinity Item | Affinity Score [0~1.00] |
|---|---|---|
| Item 1 | Item 2 | 0.99 |
| | Item 3 | 0.98 |
| | Item 4 | 0.01 |

Figure 6

| Predictor Item | Affinity Item | Affinity Score [0~1.00] | Precomputed Distance |
|---|---|---|---|
| Item 1 | Item 2 | 0.99 | 1 |
| | Item 3 | 0.98 | 5 |
| | ~~Item 4~~ | ~~0.01~~ | |

| Predictor Item | Affinity Item | Affinity Score [0–1.00] | Precomputed Distance | Final Score |
|---|---|---|---|---|
| /Retail/Pets/Grooming | /Retail/Pets | 0.99 | 1 | |
| | /Music/Classic | 0.98 | 5 | |
| | ~~/Music/R&B~~ | ~~-0.01~~ | | |

*Figure 7*

ENGAGEMENT-ORIENTED RECOMMENDATION PRINCIPLE

FIELD OF THE INVENTION

The present invention is related to the field of targeting and is more specifically directed to Engagement Oriented Recommendation.

BACKGROUND

Online networks, such as the Internet, connect a multitude of different users to an abundance of content. Just as the users are varied, the content is similarly varied in nature and type. In particular, the Internet provides a mechanism for merchants to offer a vast amount of products and services to consumers. Internet portals provide users an entrance and guide into the vast resources of the Internet. Typically, an Internet portal provides a range of search, email, news, shopping, chat, maps, finance, entertainment, and other Internet services and content. Yahoo, the assignee of the present invention, is an example of such an Internet portal.

When a user visits certain locations on the Internet (e.g., web sites), including an Internet portal, the user enters information in the form of online activity. This information may be recorded and analyzed to determine behavioral patterns and interests of the user. In turn, these behavioral patterns and interests may be used to target the user to provide a more meaningful and rich experience on the Internet, such as an Internet portal site. For example, if interests in certain products and services of the user are determined, advertisements and other content, pertaining to those products and services, may be served to the user. A targeting system that serves highly appropriate content benefits both the content provider, who provides their message to a target audience, and a user who receives content in areas of interest to the user.

Currently, providing content through computer networks such as the Internet is widespread along with content through other mediums, such as television, radio, or print. Different online content has different objectives and appeal depending on the user toward whom the content is targeted. The value to the user of media or a particular medium will largely be based on the quality of the content provided to the user. Quality has a number of factors, including the relevance to a specific user at a specific moment in time, for instance. Hence, considering the vast amount of information available to the broad spectrum of disparate users, the delivery of quality content at any given time is not a trivial task. Moreover, content is conventionally presented by using limited resources. These resources might include inventory locations or placements for content that are distributed through a set of content properties. Maximizing use of these limited resources has certain advantages.

SUMMARY

The content provided to users may take the form of advertisements and/or recommendations for products, services, and/or additional related content. Generally, a select set of recommendations from the domain of all possible recommendation items has greater relevance to a particular user. This set of recommendations may be further ranked in order of different measures of quality. While making recommendations to users from a selected set of recommendations, the top recommendations often have a narrow scope and may only include very similar items or items that are undesirably clustered around a narrow set of topics. Presenting highly similar items to users presents the following drawbacks. First, due to a perceived amount of redundancy of recommendations from a small cluster, users have an increased tendency to become quickly "burned out" on the narrow scope of choices presented to them. Hence, interest in the same products and/or categories may become saturated. Further, the content will appear stale thereby undesirably diminishing the users' level of interest. Second, users' network experience and engagement level are limited to a narrow clustered scope, which undesirably limits cross selling, content breadth, and other opportunities for broadening user growth and level of engagement. To address these concerns, embodiments of the invention provide content and/or category-aware recommendation that balances and prioritizes among categories that are highly related, and yet, are different in various ways, such as by possessing distant semantics, and thus are more likely to involve broader or more remote topics or categories. As a result, users are introduced to greater variety of topics, and thus their engagement level is further promoted.

In some implementations, a method selects a predictor item that has a relevance to a user. The method receives a set of affinity items having affinity scores that relate the predictor item to the affinity items. The method filters the received affinity items based on the affinity scores, and selects a first set of affinity items from the filtered items. For each selected affinity item, the method calculates a difference score. The difference score indicates a difference of the affinity item from the predictor item. The method selects a first affinity item based on the difference score for the first affinity item. Preferably, content is presented to the user based on the selected first affinity item.

The filtering of some embodiments identifies affinity items having affinity scores that are greater than a threshold. In these embodiments, further calculations are selectively performed for the most relevant affinity items, thereby improving performance by reducing the amount of calculations that have lower relevance, and therefore, lesser utility. In a particular implementation, the predictor item and the affinity item are categorized in a hierarchical tree structure such as, for example, a directory tree or a category tree. In these cases, the difference score is based on a distance metric between the predictor item and the first affinity item. Preferably, the distance metric is precalculated and/or stored in a high access speed type format such as, for example, a lookup type table.

Some embodiments generally compare the difference scores for the first affinity item and a second affinity item, and select and/or recommend one or the other based on the difference scores. For cases where greater breadth of user engagement is desired, the method preferably selects the affinity item that provides a broader range of user interaction, and a reduced likelihood of clustering. In some embodiments, a total score is determined for the first affinity item and a second affinity item. The total score includes the affinity score and the difference score for the particular affinity item. Some of these embodiments select the affinity item having the higher total score after comparing the total scores for the first affinity item and the second affinity item. For some implementations, the total score further includes a weight factor applied to the difference score. The weight factor scales the difference score to the scale of the affinity score, and further adjusts the significance of the difference score in the total score. Additional embodiments include a system and/or computer readable medium having instructions for implementation and/or execution of the foregoing.

BRIEF DESCRIPTION OF THE DRAWINGS

The novel features of the invention are set forth in the appended claims. However, for purpose of explanation, several embodiments of the invention are set forth in the following figures.

FIG. 5 illustrates a table for consolidation and filtering.

FIG. 6 illustrates a table including difference and/or total scores.

FIG. 7 illustrates a table for a directory tree example.

DETAILED DESCRIPTION

In the following description, numerous details are set forth for purpose of explanation. However, one of ordinary skill in the art will realize that the invention may be practiced without the use of these specific details. In other instances, well-known structures and devices are shown in block diagram form in order not to obscure the description of the invention with unnecessary detail.

Conventional targeting systems usually generate and choose recommendations by using affinity scores. The affinity scores identify and measure relationships between the chosen recommendations and predictive data. By virtue of this system, however, the highest ranked (or scored) recommendations are often undesirably too similar to each other and provide no new, or no variety of content or service. As a result, the content provided by such traditional recommendation models often undesirably causes increased user burn out rate, and/or waste of network inventory. In order to address this problem, some embodiments include novel methods and systems for including additional information into the selection of recommendations. More specifically, some embodiments determine and/or present category-sensitive recommendations. For instance, particular embodiments of the invention integrate category structures with recommendation items. These embodiments advantageously include three components: affinity scoring, categorization for affinity items, and category sensitive recommendation and/or presentation.

Affinity Score

Recommendation items are typically selected from a broad variety of content types. Items of content have various relationships including affinities between each item. The relationships are preferably identified and/or measured by a scoring system. These relationships are further represented by dividing the content items into a predictor item and affinity items for the predictor item based on the various relationships. Recommendation items are preferably selected from the pool of content items based on one or more predictor items and various relationships to several affinity items.

Figure 1:
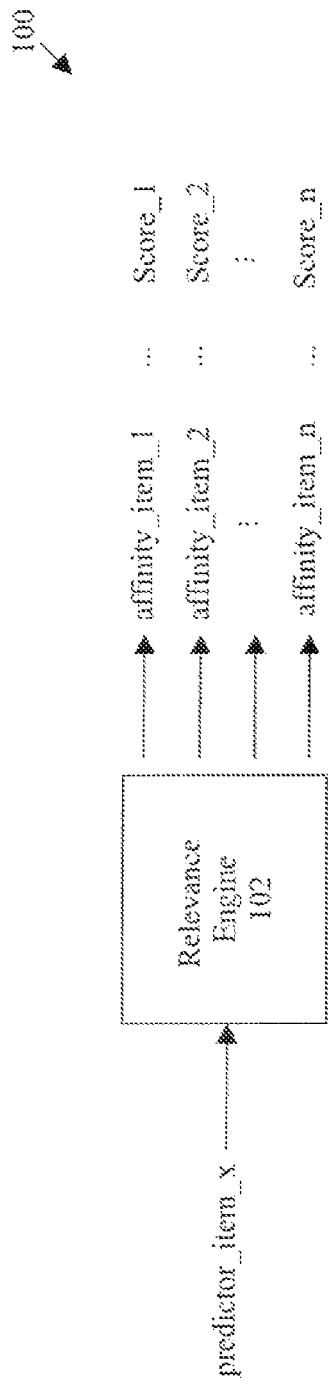
FIG. 1 illustrates a relevance engine for computing affinity scores.

Preferably, affinity scores are built among the content items by an advantageous affinity algorithm. For instance, FIG. 1 illustrates a system 100 for the determination of relationships or affinities, and/or the scoring of the affinities. As shown in this figure, a predictor item (x) is input to a relevance engine 102, which preferably outputs several affinity items and scores that describe a relationship of each affinity item to the predictor item. Some embodiments use a list format for the output of the engine 102. However, one of ordinary skill recognizes alternatives for the output of the relevance engine 102. A particular implementation of the system 100 uses the Yahoo Affinity Engine, provided by Yahoo Inc., of Sunnyvale, Calif. In these embodiments, the output of the engine 102 preferably has the following format, where predictor_item_x is the predictor item and affinity_item_n is one affinity item with an affinity score of score_xn:

(predictor_item_x, affinity_item_n, score_xn).

Categories and Content Items

Figure 2:
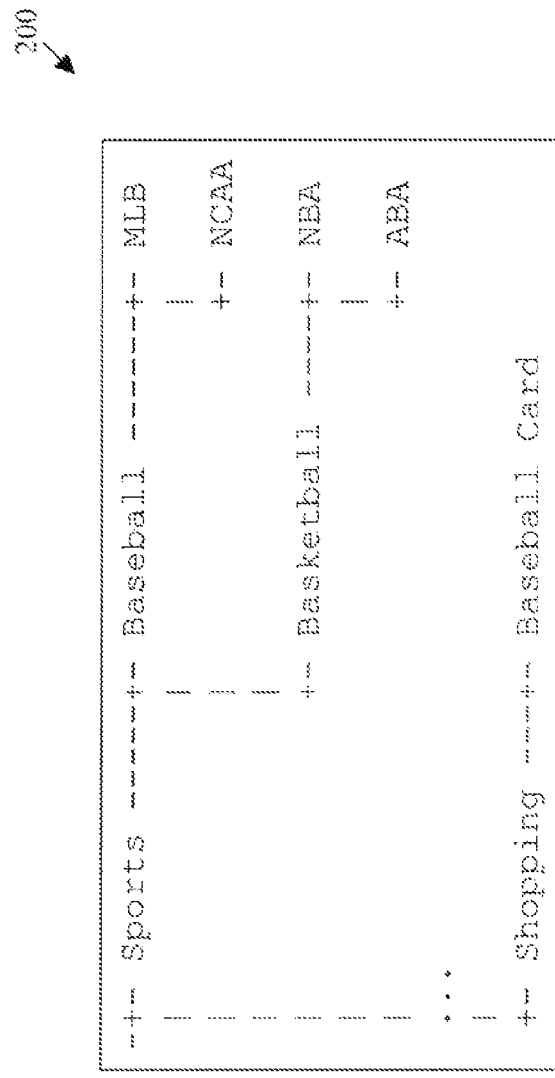
FIG. 2 illustrates a hierarchical tree structure for items and/or categories.

In addition to affinity measures, some embodiments determine several categories, $\{C\_1, C\_2, \ldots, C\_n\}$ for content and/or recommendation items, where each item is advantageously grouped with one or multiple categories. One of ordinary skill recognizes a variety of implementations for representing the relationships between categories, and/or items within the categories. For instance, one implementation of category structure is a relational hierarchy, in which categories are organized in a hierarchical tree structure. A parent category represents a broader category, or a super set, that semantically covers all of its child categories. For example, FIG. 2 illustrates a hierarchical tree structure 200 for categories including super-categories and subcategories. As shown in this figure, the super category Sports has categories such as Baseball and Basketball. Further, each of these categories has further subcategories such as major league baseball (MLB), and college or NCAA_Baseball for Baseball, while the Basketball category has NBA and ABA subcategories.

Difference Measures

As described above, each category and item within each category of FIG. 2, has a relationship to each other category and/or item within the structure 200, that is preferably measured by using an affinity scoring system described above in relation to FIG. 1. Moreover, the categories and/or items within each category of FIG. 2 further include differences between each other such as, for example, semantic, categorical, and/or conceptual or associative differences. For the hierarchical tree structure 200 of FIG. 2, one useful definition of difference between categories, subcategories, and/or items therein, is a distance metric such as, for example, the distance between two categories $C\_1$ and $C\_2$. Hence, in some embodiments, a categorical distance function, $C\_Dist(C\_i, C\_j)$, is advantageously employed to represent a "difference" between category $C\_i$ and $C\_j$. A larger distance metric between $C\_i$ and $C\_j$, generally indicates more different such as, for example, more semantically different. In a particular implementation, $C\_Dis(C\_1, C\_2)$ is the minimum number of steps that are needed to move through the category tree structure from $C\_1$ to $C\_2$. Accordingly, in the Sports example:

C_Dis(MLB, NCAA_Baseball)
=MLB→Baseball→NCAA_Baseball=2; and

C_Dis(MLB, NBA)
=MLB→Baseball→Sports→Basketball→NBA=4.

Figure 3:
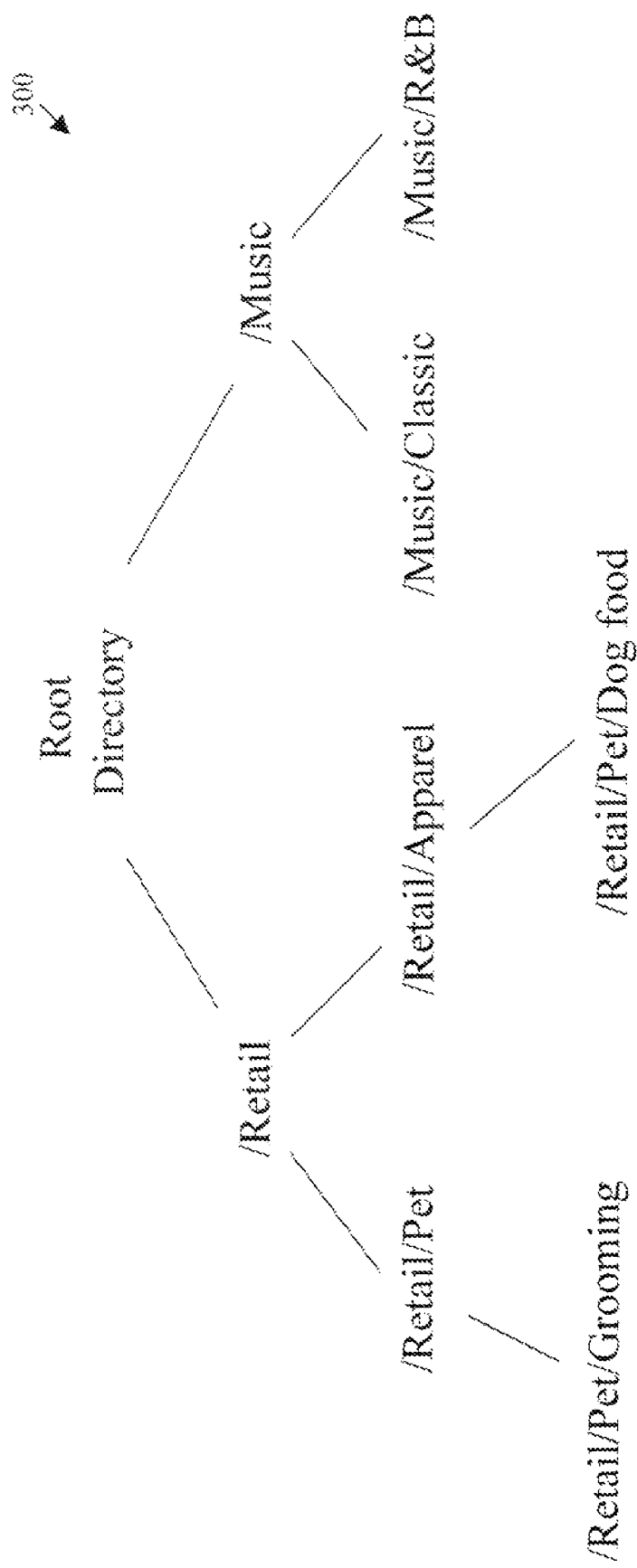
FIG. 3 illustrates a directory structure for items and/or categories.

For implementations that use distance as the difference metric, other types of category structures are also applicable if an appropriate distance function is defined for the structure. For instance, FIG. 3 illustrates a directory tree structure 300 of some embodiments. As shown in this figure, the directory structure includes a root directory /, and directories such as /Retail and /Music. Within each of these directories are sub directories, sub-sub directories, and so forth. For instance, the /Retail directory includes a sub directory for /Retail/Pet and therein a sub-sub directory for /Retail/Pet/Grooming, while the /Music directory includes a sub directory for /Music/Classic. Hereinafter, directories, sub directories, categories, and sub categories, may simply be referred to as directories, and/or categories.

As shown by FIG. 3, the directories within the directory structure 300 have relevances to each other, such that items grouped within each directory are advantageously scored based on relevance and/or affinity, as described above. Typically, items within a directory or that are sub or super directories have higher relevance and/or affinities to each other, than items that are located within distinct directories that are located along a separate branch of sub directories, for example.

Figure 4:
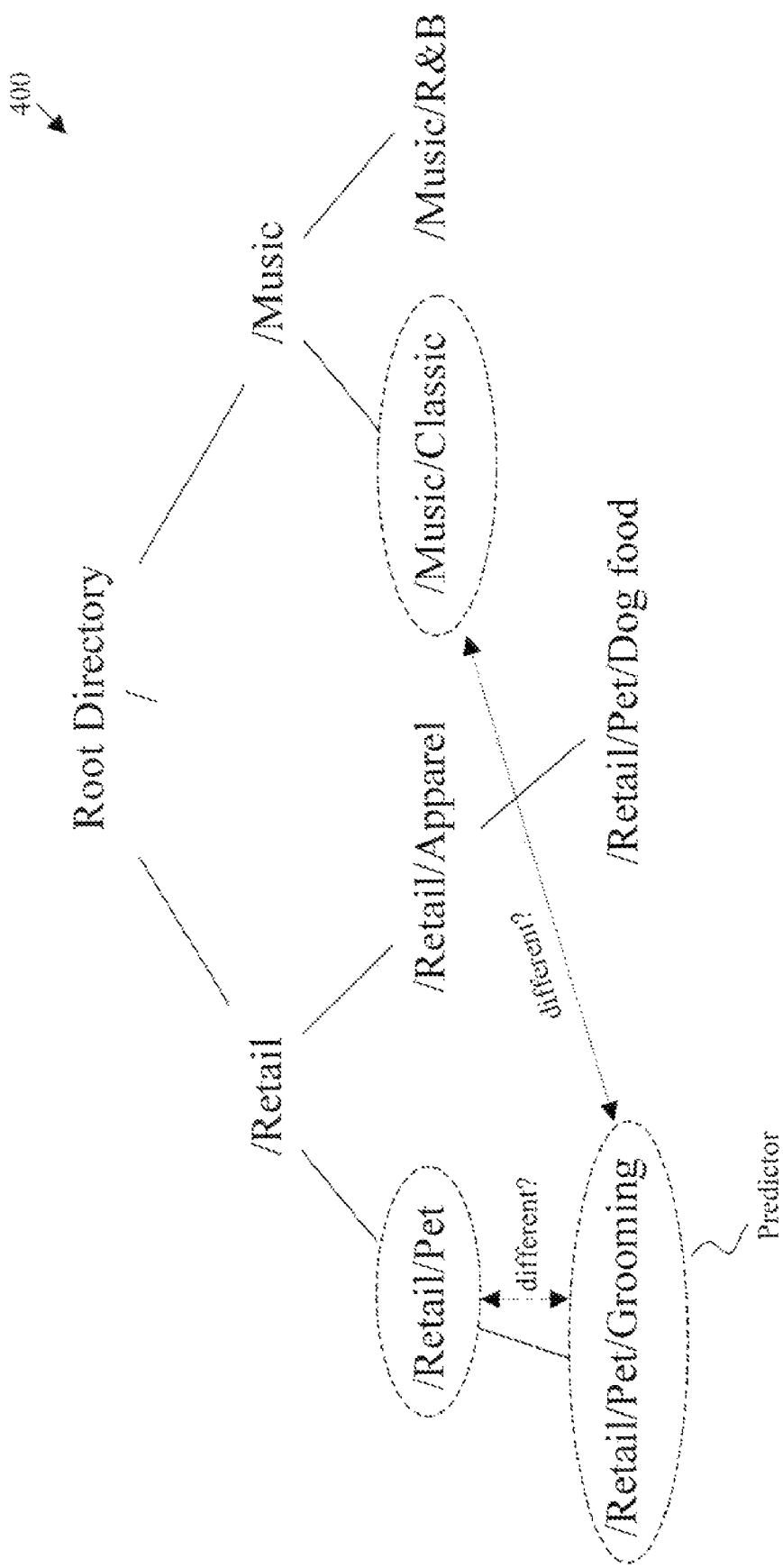
FIG. 4 illustrates a measure of difference by using the directory structure.

The directories illustrated by FIG. 3 have differences as well. For instance, FIG. 4 illustrates that the directory /Retail/Pet/Grooming is selected as a predictor item. Generally, a predictor item has a known relevance or importance to a user. As described above, the predictor item has relevance to each other item in the structure 400. In relation to the predictor item, the other items in the structure 400 are referred to as affinity items. The relevance of each affinity item to the predictor item is preferably measured by using affinity scores. The predictor item, however, further has differences from each of the affinity items. Some embodiments measure such differences by using a distance metric. In a particular implementation, the distance metric is calculated by counting the number of directory traversals between the predictor item and the affinity item. Hence, in this example, the distance from /Retail/Pet/Grooming to /Retail/Pet is one, while the distance from /Retail/Pet/Grooming to /Music/Classic is five, for example (three directory traversals to the root directory, and two traversals from the root directory to the /Music/Classic directory).

Accordingly, the affinity items /Retail/Pet and /Music/Classic may have similar or equally high affinities to the predictor item /Retail/Pet/Grooming. However, these same affinity items may have very different alternative relational characteristics such as directory, category, and/or tree distance, for example. The foregoing examples describe categories and directories in various advantageous structures. One of ordinary skill recognizes, however, that the discussion herein applies equally to items of content such as within each of the categories and/or directories, as well.

Category Sensitive Recommendation for Affinity Items

Embodiments of the invention advantageously balance recommendations across a broader range of categories of affinity items by balancing selections for recommendation items associated with distinct and more diverse categories. Further, some embodiments particularly select and/or recommend items in distant categories to promote a broader level of user engagement. The foregoing is represented symbolically herein, by way of example. For a selected predictor item K, a list of affinity items, separately Aff_Item_i with affinity score AFF_Score_i, is preferably identified based on the affinity scores that relate each affinity item to the predictor item. Some embodiments use the relevance engine 102 described above in relation to FIG. 1. Some of these embodiments further determine a difference measure for the affinity items in the list such as by using a distance metric, as described above. In an implementation, the data are advantageously compiled as follows, where Cat_i is the category of the affinity item and C_Dis_i is the distance between Cat_i and the category of the predictor item K:

(Aff_Item_1, AFF_Score_1, Cat_1, C_Dis_1)
(Aff_Item_2, AFF_Score_2, Cat_1, C_Dis_1)
(Aff_Item_3, AFF_Score_3, Cat_1, C_Dis_1)
(Aff_Item_4, AFF_Score_4, Cat_1, C_Dis_1) . . .
(Aff_Item_m, AFF_Score_m, Cat_1, C_Dis_1)
(Aff_Item_n, AFF_Score_n, Cat_2, C_Dis_2)
(Aff_Item_p, AFF_Score_p, Cat_2, C_Dis_2)
(Aff_Item_q, AFF_Score_q, Cat_1, C_Dis_1)
(Aff_Item_r, AFF_Score_r, Cat_3, C_Dis_3) . . .

Conventionally, when recommendations are made solely based on affinity scores, several drawbacks often occur. For instance, in some cases, the top scoring affinity items may cluster. That is, all the items that are likely selected for recommendation belong to the same category, or a small group of categories and subcategories, while there are other relevant and desirable items for recommendation that are associated with other categories. Traditionally, these desirable items and/or categories may never be selected for recommendation. The foregoing clustering problem is further addressed below by way of examples.

Some embodiments distribute selections for recommendation inventory among a broader range of categories that appear in the list of relevant affinity items. For example, inventory for presentation of content is a limited resource. In an exemplary case, on each page view, a maximum of M recommendations can be served. Meanwhile, three categories Cat_1, Cat_2, and Cat_3, are identified that contain particularly relevant prospective recommendation items. Thus, each of the categories involved in this example, Cat_1, Cat_2, and Cat_3, are preferably allocated with a distribution of the inventory for presentation. For instance, some embodiments average and distribute the available inventory equally across the identified relevant categories. In this example of three relevant categories, one inventory distribution is to distribute M/3 inventory locations for each identified category.

An alternative implementation employs the categorical structures of the FIGS. 2, 3 and 4, illustrated above, to reduce the negative effects of clustering. This implementation combines the affinity scores with a distance metric to produce one total score. Some embodiments further include weighting parameters to adjust the importance of individual components. An example formula for combining the affinity score and the distance metric is:

$$\text{Final\_Score} = \text{Aff\_Score} + C * \text{Category\_Distance}.$$

In this example, the parameter C is a distance weighting parameter. With a larger value of the parameter C, the difference metric, in this case Category_Distance, receives a heavier weight, and thus, affinity items of more distant categories have higher scores, which increases a likelihood of being selected for recommendation to the user. Further, the parameter C of some embodiments provides scaling for the distance metric such that the distance score does not overwhelm the affinity score in the calculation of the final score. In some embodiments, the parameter C is adjusted by the user, and/or the parameter is optionally predetermined.

FIG. 5 illustrates a table 500 for the organization of predictor and/or affinity items. As shown in this figure, an exemplary predictor item 1, is shown with scoring for three affinity items 2, 3 and 4. In the illustration, the affinity item 2 has an affinity score of 0.99, affinity item 3 has an affinity score of 0.98, and affinity item 4 has 0.01. In this illustration, the affinity score has a scale from 0.00 to 1.00, however, one of ordinary recognizes other scales such as, for example, 0 to 100, or another scale. Further, FIG. 5 illustrates operation at the item-level, however, operation upon categories, directories, or other structural objects is understood as well.

Preferably, the data in the table 500 are received from a relevance engine that is optimized to determine associations and scores between the different items. Some embodiments include affinity items that have low affinity scores. Some of these embodiments filter the affinity items that have low affinity scores such that no further calculations are expended for these items that have a lower likelihood of relevance to the user.

FIG. 6 illustrates a revised table 600 of such an embodiment. As shown in this figure, the affinity item 4 is illustratively stricken from the table 600 for having a low affinity score of 0.01. Some embodiments generate a new data set that contains only those affinity items having affinity scores above a threshold. In FIG. 6, the affinity item 4 is stricken, however, to show that no additional computation such as distance pre-computation, for example, is performed for the affinity item 4. For the remaining affinity items (e.g., Items 2 and 3) having more significant relevance to the predictor item 1, a distance metric is computed. Preferably, the distance metric is pre-computed and stored in a format that facilitates rapid recall such as, for example, a lookup table or the like.

FIG. 7 illustrates an example 700 that includes the directories from an example given above. More specifically, the directory /Retail/Pets/Grooming is inserted as the predictor item 1, /Retail/Pets is inserted as the affinity item 2, and /Music/Classic is inserted as the affinity item 3. As described above, the distance metric for the affinity item /Retail/Pets is computed as one, and the distance metric for /Music/Classic is computed as five, from the example above. Advantageously, additional computation is omitted for items having affinity scores that are too low.

Figure 8:
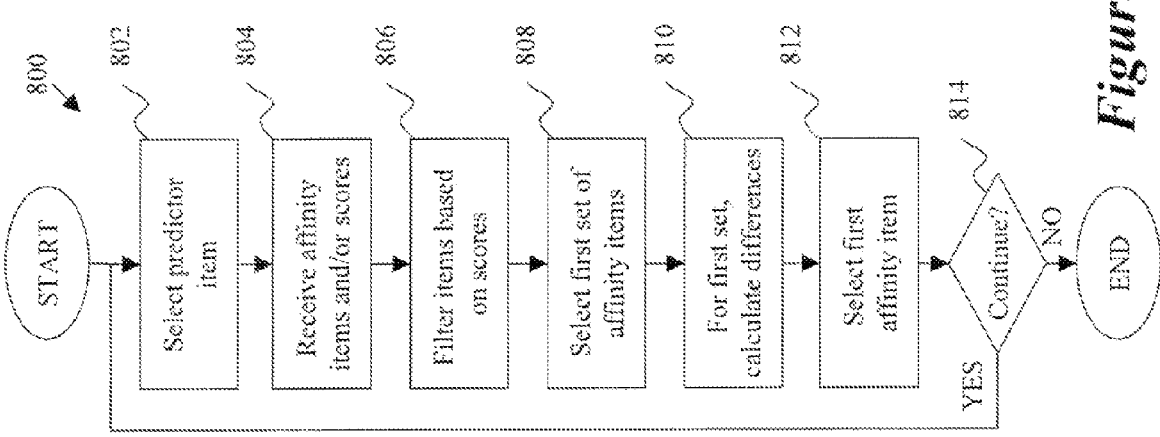
FIG. 8 illustrates a process flow in accordance with some embodiments.

FIG. 8 illustrates a process 800 that summarizes some of the embodiments described above. As shown in this figure, the process 800 begins at the step 802, where a predictor item is selected. The predictor item has a relevance to a user such as, for example, an item within the category /Retail/Pets/Grooming for a user who has a significant interest for pet grooming supplies or services. Once the predictor item is selected, the process 800 transitions to the step 804, where the process 800 receives a plurality of affinity items having affinity scores. As mentioned above, the affinity scores relate the predictor item to the affinity items. The generation of affinity scores typically involves a relevance engine, and may take place separately from the process 800, or may be performed in conjunction with the process 800. Regardless of how the scores are generated, the received affinity items, and/or scores are often in an advantageously arranged list format.

At the step 806, the received affinity items are filtered based on the affinity scores. For instance, some embodiments sort the received affinity items in a sorted list format by using the affinity scores, and then identify affinity items having affinity scores greater than a threshold. These cases preferably forego further calculations for affinity items that have little relevance for the predictor item thereby advantageously reducing the amount of excessive calculation.

Accordingly, at the step 808, a first set of affinity items is selected from the received affinity items. Then, at the step 810, for each selected affinity item, a difference score is calculated that measures a difference from the predictor item. In a particular, embodiment, the predictor item and affinity items are represented in a tree structure, and the difference score is based on a distance metric that measures the distance between the predictor item and each affinity item within the tree.

At the step 812, the process 800 further selects a first affinity item from the first set of affinity items, based on the difference score for the first affinity item. For instance, some embodiments calculate a total score for the first affinity item and for a second affinity item. In this example, the process 800 may select the affinity item that has a higher total score for presentation to the user, as the score having higher value in both relevance and difference (e.g., a non-clustered but still highly relevant item). Optionally, the process 800 may present the selected first item or an item relevant thereto, to the user. For instance, where the item comprises advertising, the item may be placed in an inventory location on a property page, for presentation to the user.

At the step 814, a determination is made whether to continue. If at the step 814, the process 800 should continue, then the process 800 returns to the step 800. Otherwise, the process 800 concludes.

Figure 9:
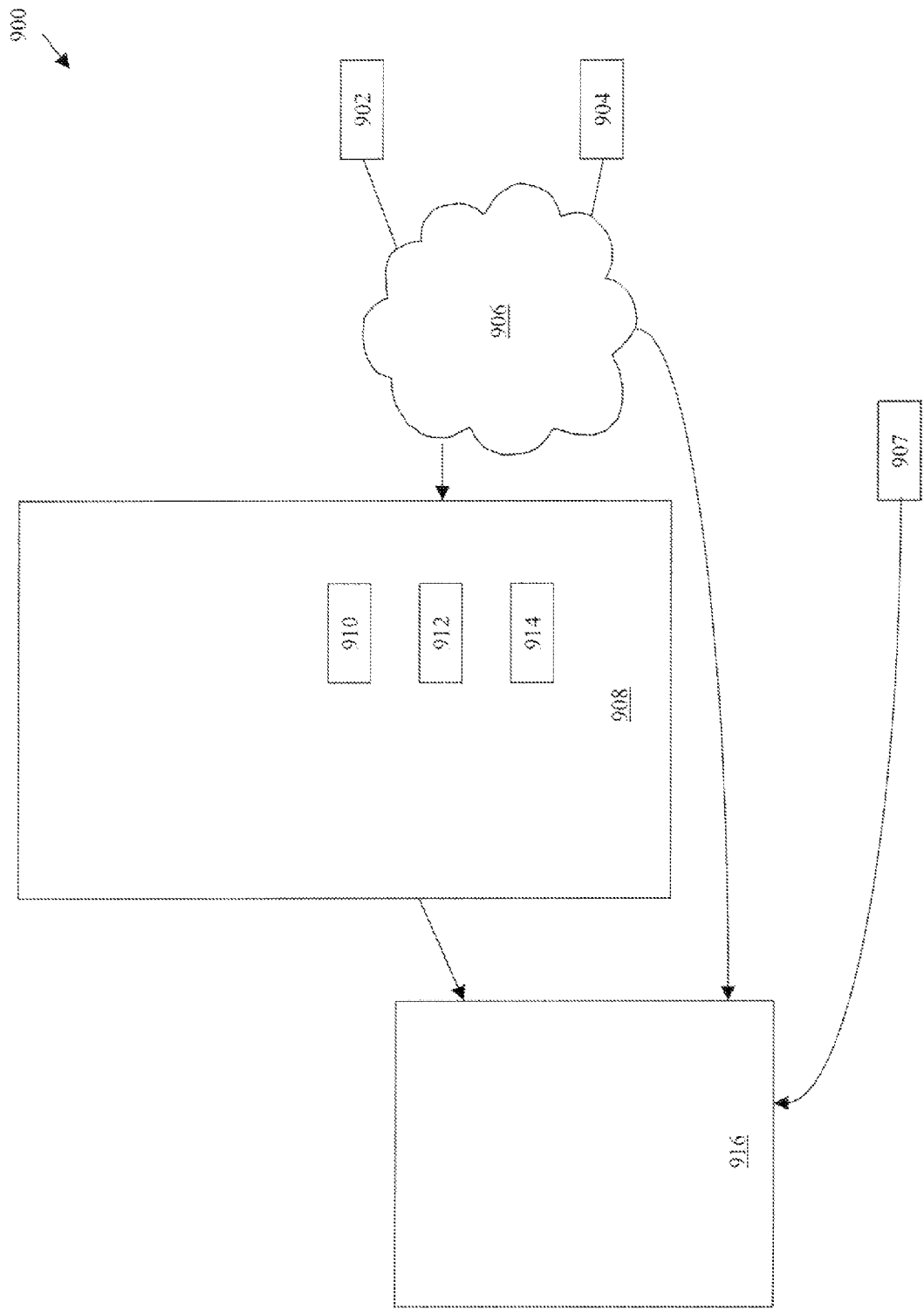
FIG. 9 illustrates a system having inventory locations and placements.

FIG. 9 illustrates a system 900 for presenting content including advertising to users through a network. As shown in this figure, the system 900 includes a plurality of users 902 and 904 that interact with a network 906. The network includes local area networks, wide area networks, and networks of networks such as the Internet, for example. The network 906 typically includes several sites comprising a number of web pages having content and inventory. The inventory is for the presentation of advertising to the users 902 and 904. Accordingly, the network 906 is coupled to an exemplary site or page 908 that includes several inventory placements 910, 912 and 914. The site 908 is coupled to a server 916 for data collection and processing. The server 916 receives data from a variety of sources, including directly from the users 902 and 904, from the network 906, from the site 908, and/or from another source 907. Typically, the site 908 is provided by a publisher, while the server 916 is typically provided by a network portal and/or an Internet portal. Further, as users 902 and 904 interact with the network 906, and the site 908, advertisements placed in the inventory of the site 908, are presented to the users 902 and 904.

The selection and/or presentation of advertising through the inventory is a non trivial process. The inventory are typically distributed across many varied sites and pages, there are many different users and types of users, and marketers, advertisements, and ad campaigns are usually numerous and varied as well. The foregoing describes a novel recommendation mechanism that promotes variety for recommendations in the selection and/or placement of content with inventory. The mechanism advantageously reduces user burn out rate, and further increases user engagement level. More specifically, particular implementations consider both affinity scores and semantic category distance. While the invention has been described with reference to numerous specific details, one of ordinary skill in the art will recognize that the invention can be embodied in other specific forms without departing from the spirit of the invention. For instance, while the embodiments above are described in relation to online content, one of ordinary skill recognizes applications in additional media and data types. Thus, one of ordinary skill in the art would understand that the invention is not to be limited by the foregoing illustrative details, but rather is to be defined by the appended claims.

What is claimed is:

1. A computer implemented method of targeting, the method comprising:
  receiving, at a computer, online activity of at least one user;
  selecting, using a computer, a predictor item having a relevance to the online activity of the user;
  receiving, at a computer, a plurality of affinity items having affinity scores that indicate relevance between the predictor item and the affinity items, wherein the affinity items and the predictor items are categorized in a classification system comprising a plurality of nodes arranged in a hierarchical tree structure;

identifying, using a computer, affinity items from among the plurality of affinity items having affinity scores that are greater than a threshold;

calculating, using computer, a difference score measuring a difference between the identified affinity items and the predictor item, wherein the difference score corresponds to the number of nodes separating said predictor item and the identified affinity items within said hierarchical tree structure;

selecting, using a computer, a first affinity item from among the identified affinity items based on a difference score for the first affinity item; and using, in a computer, the first affinity item to target advertising to the user.

2. The computer implemented method of claim 1, further comprising: presenting to the user, using a computer, content based on the selected first affinity item.

3. The computer implemented method of claim 1, further comprising:

for the first affinity item, determining, using a computer, a first total score comprising the affinity score and the difference score for the first affinity item;

for a second affinity item, determining, using a computer, a second total score comprising the affinity score and the difference score for the second affinity item; and selecting, using a computer, the first affinity item further comprising: comparing the first and second total scores for the first and second affinity items.

4. The computer implemented method of claim 3, the step of determining a total score further comprising: applying, using computer, a weight factor to the difference score thereby scaling the difference score to the affinity score, and further thereby adjusting the significance of the difference score in the total score.

5. A computer readable medium storing a program having sets of instructions for targeting, the sets of instructions comprising instructions for:

receiving, at a computer, online activity of at least one user;

selecting, using a computer, a predictor item having a relevance to the online activity of the user;

receiving, at a computer, a plurality of affinity items having affinity scores that indicate relevance between the predictor item and the affinity items, wherein the affinity items and the predictor items are categorized in a classification system comprising a plurality of nodes arranged in a hierarchical tree structure;

identifying, using a computer, affinity items from among the plurality of affinity items having affinity scores that are greater than a threshold;

calculating, using computer, a difference score measuring a difference between the identified affinity items and the predictor item, wherein the difference score corresponds to the number of nodes separating said predictor item and the identified affinity items within said hierarchical tree structure;

selecting, using a computer a first affinity item from among the identified affinity items based on a difference score for the first affinity item; and using, in a computer, the first affinity item to target advertising to the user.

6. The computer readable medium of claim 5, further comprising instructions for: presenting to the user, content based on the selected first affinity item.

7. The computer readable medium of claim 5, further comprising instructions for:

for the first affinity item, determining a first total score comprising the affinity score and the difference score for the first affinity item;

for a second affinity item, determining a second total score comprising the affinity score and the difference score for the second affinity item; and the instructions for selecting the first affinity item further comprising instructions for: comparing the first and second total scores for the first affinity item and the second affinity item.

8. The computer readable medium of claim 7, determining a total score further comprising: applying a weight factor to the difference score thereby scaling the difference score to the affinity score, and further thereby adjusting the significance of the difference score in the total score.

9. A system for targeting, the system configured for:

receiving, at a computer, online activity of at least one user;

selecting, using a computer, a predictor item having a relevance to the online activity of the user;

receiving, at a computer, a plurality of affinity items having affinity scores that indicate relevance between the predictor item and the affinity items, wherein the affinity items and the predictor items are categorized in a classification system comprising a plurality of nodes arranged in a hierarchical tree structure;

identifying, using a computer, affinity items from among the plurality of affinity items having affinity scores that are greater than a threshold;

calculating, using computer, a difference score measuring a difference between the identified affinity items and the predictor item, wherein the difference score corresponds to the number of nodes separating said predictor item and the identified affinity items within said hierarchical tree structure;

selecting, using computer, a first affinity item from among the identified affinity items based on a difference score for the first affinity item; and using, in a computer, the first affinity item to target advertising to the user.

10. The system of claim 9, further configured for: presenting to the user, content based on the selected first affinity item.

11. The system of claim 9, further configured for:

for the first affinity item, determining a first total score comprising the affinity score and the difference score for the first affinity item;

for a second affinity item, determining a second total score comprising the affinity score and the difference score for the second affinity item; and the system comprising a comparator for comparing the first and second total scores for the first affinity item and the second affinity item.

12. The system of claim 11, determining a total score further comprising: a weight factor for scaling the difference score to the affinity score, and further for adjusting the significance of the difference score in the total score.

* * * * *